Patented Sept. 7, 1926.

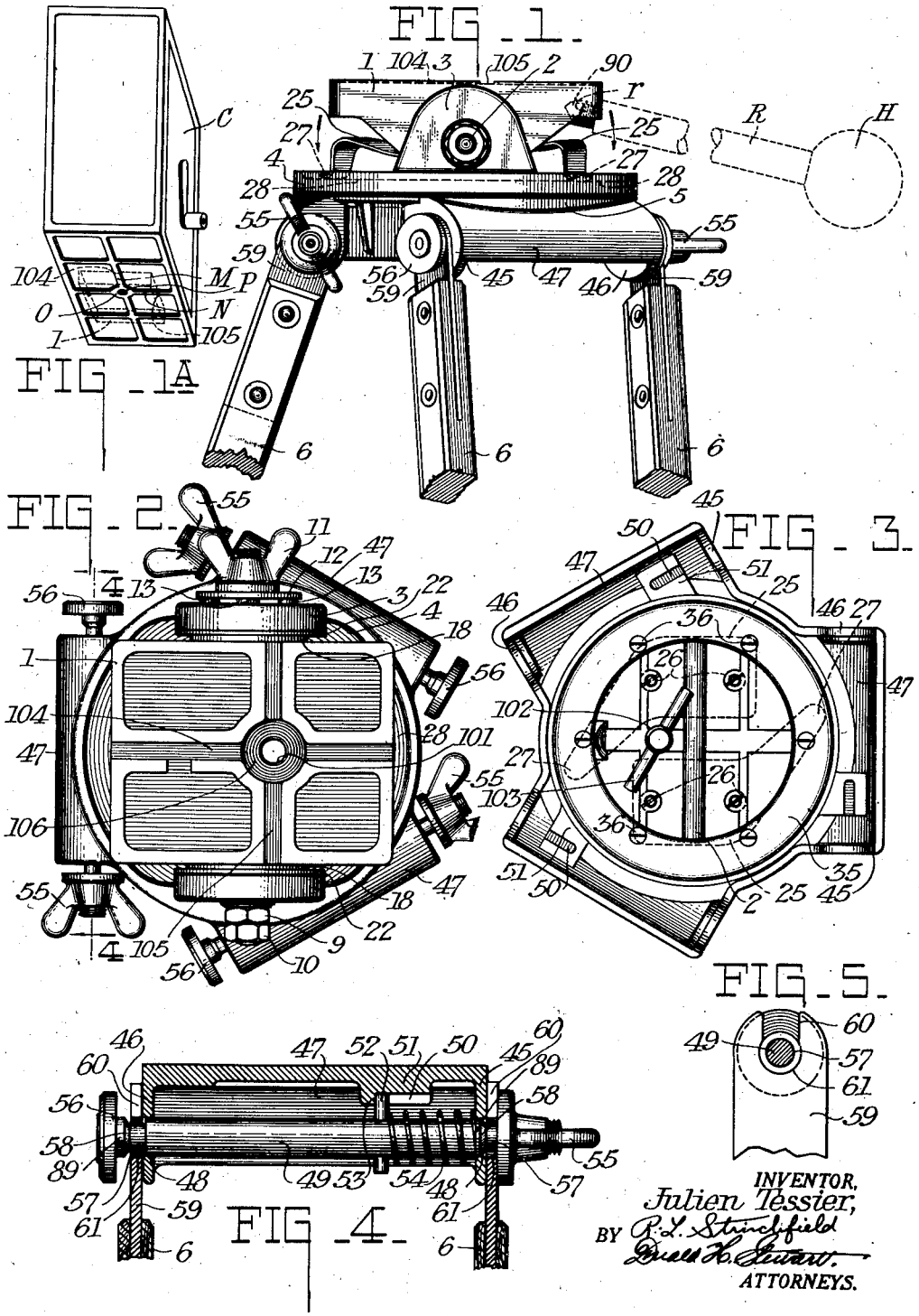

1,598,943

UNITED STATES PATENT OFFICE.

JULIEN TESSIER, OF ROCHESTER, NEW YORK, ASSIGNOR TO EASTMAN KODAK COMPANY, OF ROCHESTER, NEW YORK, A CORPORATION OF NEW YORK.

TRIPOD.

Application filed June 29, 1923. Serial No. 648,567.

This invention relates to photography and more particularly to supports for photographic cameras. It has for its object to provide a strong tripod which is convenient to assemble and to disassemble; to provide a quick-acting tripod leg engaging mechanism on the head; and other objects will appear from the following specification, the novel features being particularly pointed out in the claims at the end thereof.

Fig. 1 is a side elevation of a tripod (parts being broken away) constructed in accordance with and illustrating one embodiment of my invention;

Fig. 1A is a persepective view showing a typical camera bottom having ribs adapted to engage in grooves included in the preferred form of my tripod head.

Fig. 2 is a top plan view of the tripod head;

Fig. 3 is a bottom plan view with the bolts removed;

Fig. 4 is a section on line 4—4, Fig. 3; and

Fig. 5 is a detail section through a portion of a tripod leg and a holding bolt.

This tripod is particularly adapted for use with motion picture cameras which are usually relatively heavy and must be held rigidly against vibration in use.

The tripod head consists of a top 1 which may be swung about the pivot 2 supported by the lugs 3 of the turntable 4. Table 4 is mounted so as to be rotatable upon the base 5 which is supported by the legs 6.

To compensate for very heavy cameras, and also to permit relatively light tension between the top 1 and table 4, springs 25 may be added. Each spring is of the same shape, best shown in Fig. 3, and is attached to top 1 by two screws 26, so that the tip 27 of the spring rests upon the upper surface 28 of the turntable 4. When the top is tilted either way about bolt 2, in the direction shown by arrows, Fig. 1, obviously one spring or the other will be placed under tension, the tension increasing as top 1 moves from a horizontal position. The springs also materially assist in returning the camera to the normal horizontal position. Where light weight cameras are to be used these springs may be omitted.

Since the legs are generally separated from the tripod head when not in use, I provide the following quick acting bolt mechanism: The casting 5 has a series of ears 45 and 46 formed integral therewith in pairs about the periphery, each pair 45, 46 being connected by a skirt 47. Each pair is apertured at 48 to receive the largest diameter of bolt 49 (Fig. 4). There is also, inside of the skirt, a guideway 50 cut in block 51, for the pin 52 passing through bolt 49. One end 53 of the guideway forms a stop for the pin when the bolt is thrust toward it by the spring 54. The groove, of course, prevents bolt 49 from turning so that wing nut 55 can be conveniently manipulated.

One end of bolt 49 is threaded to receive wing nut 55, and the other end carries a flat head 56. Each end of bolt 49 is grooved at 57, one edge 58 of the groove being inclined. As shown in Fig. 5 the tripod leg ferrule 59 is slotted at 60 with a slot wider than the grooved portion 57 of bolt 49, but narrower than the largest diameter of the bolt. At the base of this slot there is an aperture 61 adapted to receive the large diameter of bolt 49 being seated at part 89 when locked in an operative position. The slots 60 on the ends of the tripod legs permit them to be quickly thrust over the grooved sections 57 of the bolt and then by turning wing nut 55 the tapered edges 58 quickly cam the apertures 61 up upon portions 89 of bolt 49 and are then fastened in this operative position. When nut 55 is loosened, spring 54 thrusts the bolt into a position from which the tripod legs can be drawn from the grooved portions 57 of the bolt.

If desired a handle H attached to a rod R which terminates in a threaded portion r may be screwed into socket 90 of top 1 to facilitate moving the top about pivot 2 or on table 5.

In the top 1 there is an aperture 101 through which the usual tripod nut passes, being on the end of shaft 102 which may be turned by the handle 103.

The top 1 is grooved at 104 and 105 and is countersunk at 106, these grooves and this countersunk portion being for the following purposes: First, for the tilting movement about the horizontal axis 2 to be effective it must be at right angles to the axis of the camera lens, so that one groove 104 is to engage a rib M of a camera which rib is parallel with the lens axis. The other groove 105 is at right angles thereto and engages a rib N on the camera C, (Fig. 1A). Second, the camera is held against turning by the ribs and grooves so that it can be easily placed on the tripod. And thirdly, the countersunk portion 106 by engaging a corresponding protuberance O on the camera quickly and accurately locates the tripod nut P in alignment with the opening 101 through which the nut on shaft 102 passes when the camera is attached to the tripod.

It is obvious that various changes may be made in the tripod without departing from my invention, and I contemplate as within the scope of my invention all such changes, as come within the terms of the following claims.

Having thus described my invention, what I claim as new and desire to secure by Letters Patent is:

1. In a tripod, the combination with a base, of means for supporting a leg thereon including a slidably mounted bolt, means preventing the bolt from turning, the bolt having portions of reduced diameter adapted to receive the forked ends of a tripod leg, and a wing nut carried by the bolt by which the bolt can be slid upon the mount moving portions of reduced diameter of the bolt from the forked ends of the tripod leg and supporting the ends of the leg upon full sized diameter portions of the bolt, whereby the leg may be secured to the head.

2. In a tripod, the combination with a base, of means for supporting a forked leg thereon including a slidably mounted bolt having a portion of reduced area, a spring normally moving this portion into an operative position in which it may receive the forked end of a tripod leg, and a nut mounted on the bolt for moving the bolt against the spring action into a locking position in which the reduced area of the bolt is out of alignment with the forked end of tripod leg, and in which the end of the leg may be tightly secured to the head.

3. In a tripod, the combination with a base, of a leg-attaching mechanism therefor including a slidable bolt mounted upon the base, a tripod leg adapted to be secured to the base by the bolt, means for moving the bolt to an inoperative position and means for moving the bolt to an operative position, said means also locking the leg to the base as the bolt approaches its operative position.

4. In a tripod, the combination with a base, of a leg-supporting structure thereon including a means for receiving a forked end of a tripod leg, said means being movable to lock the leg securely to the base, and means included on the base, for returning the means for receiving the forked end of the tripod leg to an initial receiving position when the locking means is released.

5. In a tripod, the combination with a base, of a leg-supporting structure thereon including a bearing on the base, a guideway on the base, a bolt slidable in the bearing and having a projection extending into the guideway to prevent the bolt from turning in the bearing, and a wing nut adapted to move the bolt longitudinally of the bearing.

6. In a tripod, the combination with a base, of a leg-supporting structure thereon including a bearing on the base, a guideway on the base, a bolt slidable in the bearing and having a projection extending into the guideway to prevent the bolt from turning in the bearing, a spring between the protuberance and the bearing tending to move the bolt in one direction, and a nut for moving the bolt against the action of the spring.

7. In a tripod, the combination with a base, of a leg-supporting structure included thereon including a bearing on the base, a guideway on the base, an end wall to the guideway, a bolt slidable in the bearing and having a protuberance engaging the guideway, a spring tending to move the bolt until the protuberance engages the end wall of the guideway, and means for moving the bolt against the spring.

Signed at Rochester, New York, this 25th day of June 1923.

JULIEN TESSIER.